United States Patent
Josephs et al.

(10) Patent No.: US 8,076,028 B2
(45) Date of Patent: Dec. 13, 2011

(54) LITHIUM CELL WITH CATHODE INCLUDING IRON DISULFIDE AND IRON SULFIDE

(75) Inventors: Barry D. Josephs, Lynn, MA (US); Michael Pozin, Brookfield, CT (US); Zhiping Jiang, Westford, MA (US); Maya Stevanovic, Danbury, CT (US); Fred J. Berkowitz, New Milford, CT (US); Yelena Kouznetsova, Brookfield, CT (US); Steven J. Specht, Brookfield, CT (US)

(73) Assignee: The Gillette Company, Cincinnati, OH (US)

( * ) Notice: Subject to any disclaimer, the term of this patent is extended or adjusted under 35 U.S.C. 154(b) by 806 days.

(21) Appl. No.: 12/148,030

(22) Filed: Apr. 16, 2008

(65) Prior Publication Data

US 2009/0263727 A1    Oct. 22, 2009

(51) Int. Cl.
H01M 4/58 (2010.01)
H01M 6/16 (2010.01)

(52) U.S. Cl. .......................... 429/221; 429/329; 429/334
(58) Field of Classification Search .................. 429/221, 429/326, 329, 334, 339, 340
See application file for complete search history.

(56) References Cited

U.S. PATENT DOCUMENTS

| | | | |
|---|---|---|---|
| 4,084,045 A * | 4/1978 | Kegelman | 429/221 X |
| 4,794,057 A | 12/1988 | Griffin | |
| 4,952,330 A | 8/1990 | Leger | |
| 4,959,281 A | 9/1990 | Nishi | |
| 5,229,227 A | 7/1993 | Webber | |
| 5,290,414 A | 3/1994 | Marple | |
| 5,432,030 A | 7/1995 | Vourlis | |
| 5,514,491 A | 5/1996 | Webber | |
| 5,698,176 A | 12/1997 | Capparella | |
| 5,731,106 A * | 3/1998 | Tsutsumi et al. | 429/332 |
| 6,218,054 B1 | 4/2001 | Webber | |
| 6,280,883 B1 | 8/2001 | Lamanna | |
| 6,849,360 B2 | 2/2005 | Marple | |
| 6,866,965 B2 | 3/2005 | Lee | |
| 7,157,185 B2 | 1/2007 | Marple | |
| 7,479,353 B2 * | 1/2009 | Hollenkamp et al. | 429/339 X |
| 2004/0185347 A1 * | 9/2004 | Kim et al. | 429/326 |
| 2005/0233214 A1 | 10/2005 | Marple | |
| 2005/0244706 A1 | 11/2005 | Wu | |

(Continued)

FOREIGN PATENT DOCUMENTS

EP    0529802 B1    4/2000

(Continued)

OTHER PUBLICATIONS

WO 2006/026415 A (Eveready Battery) Mar. 9, 2006 International Application.

(Continued)

*Primary Examiner* — Stephen J. Kalafut
(74) *Attorney, Agent, or Firm* — Vladimir Vitenberg

(57) ABSTRACT

A primary cell having an anode comprising lithium or lithium alloy and a cathode comprising iron disulfide ($FeS_2$), iron sulfide (FeS) and carbon particles. The electrolyte comprises a lithium salt dissolved in a solvent mixture. A cathode slurry is prepared comprising iron disulfide ($FeS_2$) powder, iron sulfide (FeS) powder, carbon, binder, and a liquid solvent. The mixture is coated onto a conductive substrate and solvent evaporated leaving a dry cathode coating on the substrate. The anode and cathode can be spirally wound with separator therebetween and inserted into the cell casing with electrolyte then added.

55 Claims, 5 Drawing Sheets

U.S. PATENT DOCUMENTS

| | | |
|---|---|---|
| 2005/0277023 A1 | 12/2005 | Marple |
| 2006/0019161 A1 | 1/2006 | Issaev |
| 2006/0046152 A1 | 3/2006 | Webber |
| 2006/0046153 A1 | 3/2006 | Webber |
| 2006/0046154 A1 | 3/2006 | Webber |
| 2006/0228620 A1 | 10/2006 | Martinson |
| 2007/0202409 A1 | 8/2007 | Yamakawa |
| 2008/0026296 A1 | 1/2008 | Bowden |

FOREIGN PATENT DOCUMENTS

| | | | |
|---|---|---|---|
| JP | 2007-157332 A | 6/2007 | |
| WO | WO2008/012776 A2 | 1/2008 | |

OTHER PUBLICATIONS

WO 2006/026233 A (Eveready Battery) Mar. 9, 2006 International Application.

WO 2006/026234 A (Eveready Battery) Mar. 9, 2006 International Application.

WO 00/36683 A (Moltech Corp.) Jun. 22, 2000 International Application.

* cited by examiner

LITHIUM CELL WITH CATHODE INCLUDING IRON DISULFIDE AND IRON SULFIDE

FIELD OF THE INVENTION

The invention relates to lithium primary cells having an anode comprising lithium and a cathode comprising iron disulfide ($FeS_2$) in admixture with iron sulfide (FeS).

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in an organic solvent. The cells are referenced in the art as primary lithium cells (primary $Li/MnO_2$ cells) and are generally not intended to be rechargeable. Alternative, primary lithium cells with lithium metal anodes but having different cathodes, are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically AA size or AAA size cells, but may be in other size cylindrical cells. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram, and the theoretical capacity of. The $FeS_2$ theoretical capacity is based on a 4 electron transfer from 4Li per $FeS_2$ molecule to result in reaction product of elemental iron Fe and $2Li_2S$. That is, 2 of the 4 electrons change the oxidation state of +2 for $Fe^{+2}$ in $FeS_2$ to 0 in elemental iron ($Fe^0$) and the remaining 2 electrons change the oxidation state of sulfur from −1 in $FeS_2$ to −2 in $Li_2S$.

Overall the $Li/FeS_2$ cell is much more powerful than the same size $Zn/MnO_2$ alkaline cell. That is for a given continuous current drain, particularly at higher current drain over 200 milliAmp, the voltage is flatter for longer periods for the $Li/FeS_2$ cell than the $Zn/MnO_2$ alkaline cell as may be evident in a voltage vs. time discharge profile. This results in a higher energy output obtainable from a $Li/FeS_2$ cell compared to that obtainable for a same size alkaline cell. The higher energy output of the $Li/FeS_2$ cell is more clearly and more directly shown in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the $Li/FeS_2$ cell is above that for the same size alkaline cell. This is despite that the starting voltage of both cells (fresh) is about the same, namely, between about 1.2 and 1.8 1.9 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands. Similarly the $Li/FeS_2$ cell which is a primary (nonrechargeable) cell can also be used as a replacement for the same size rechargeable nickel metal hydride cell, which has about the same voltage (fresh) as the $Li/FeS_2$ cell. Thus, the primary $Li/FeS_2$ cell can be used to power digital cameras, which require operation at high pulsed power demands.

The cathode material for the $Li/FeS_2$ cell may be initially prepared in a form such as a slurry mixture (cathode slurry), which can be readily coated onto the metal substrate by conventional coating methods. The electrolyte added to the cell must be a suitable organic electrolyte for the $Li/FeS_2$ system allowing the necessary electrochemical reactions to occur efficiently over the range of high power output desired. The electrolyte must exhibit good ionic conductivity and also be sufficiently stable, that is non reactive, with the undischarged electrode materials (anode and cathode components) and also non reactive with the discharge products. This is because undesirable oxidation/reduction reactions between the electrolyte and electrode materials (either discharged or undischarged) could thereby gradually contaminate the electrolyte and reduce its effectiveness or result in excessive gassing. This in turn can result in a catastrophic cell failure. Thus, the electrolyte used in $Li/FeS_2$ cell in addition to promoting the necessary electrochemical reactions, should also be stable to discharged and undischarged electrode materials. Additionally, the electrolyte should enable good ionic mobility and transport of the lithium ion ($Li^+$) from anode to cathode so that it can engage in the necessary reduction reaction resulting in $LiS_2$ product in the cathode.

An electrode composite is formed with a sheet of lithium, a sheet of cathode composite containing the $FeS_2$ active material and separator therebetween. The electrode composite may be spirally wound and inserted into the cell casing, for examples, as shown in U.S. Pat. No. 4,707,421. A cathode coating mixture for the $Li/FeS_2$ cell is described in U.S. Pat. No. 6,849,360. A portion of the anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

The electrolyte used in a primary $Li/FeS_2$ cells are formed of a "lithium salt" dissolved in an "organic solvent". Representative lithium salts which may be used in electrolytes for $Li/FeS_2$ primary cells are referenced in U.S. Pat. No. 5,290,414 and U.S. Pat. No. 6,849,360 B2 and include such salts as: Lithium trifluoromethanesulfonate, $LiCF_3SO_3$ (LiTFS); lithium bistrifluoromethylsulfonyl imide, $Li(CF_3SO_2)_2N$ (LiTFSI); lithium iodide, LiI; lithium bromide, LiBr; lithium tetrafluoroborate, $LiBF_4$; lithium hexafluorophosphate, $LiPF_6$; lithium hexafluoroarsenate, $LiAsF_6$; $Li(CF_3SO_2)_3C$, and various mixtures. In the art of $Li/FeS_2$ electrochemistry lithium salts are not always interchangeable as specific salts work best with specific electrolyte solvent mixtures.

In U.S. Pat. No. 5,290,414 (Marple) is reported use of a beneficial electrolyte for $FeS_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimethoxyethane (DME). As given in the example the dioxolane and 1,2-dimethoxyethane (DME) are present in the electrolyte in substantial amount, i.e., 50 vol % 1,3-dioxolane (DX) and 40 vol % dimethoxyethane (DME) or 25 vol % 1,3-dioxolane (DX) and 75 vol. % dimethoxyethane (DME) (col. 7, lines 47-54). A specific lithium salt ionizable in such solvent mixture(s), as given in the example, is lithium trifluoromethane sulfonate, $LiCF_3SO_3$. Another lithium salt, namely lithium bistrifluoromethylsulfonyl imide, $Li(CF_3SO_2)_2N$ is also mentioned at col. 7, line 18-19. The reference teaches that a third solvent may optionally be added selected from 3,5-dimethylisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19) with the preferred being 3,5-dimethylisoxazole.

In U.S. Pat. No. 6,218,054 (Webber) is disclosed an electrolyte solvent system wherein dioxolane-based solvent and dimethoxyethane-based solvent are present in a weight ratio of about 1:3 (1 part by weight dioxolane to 3 parts by weight dimethoxyethane).

In U.S. Pat. No. 6,849,360 B2 (Marple) is disclosed an electrolyte for an $Li/FeS_2$ cell, wherein the electrolyte comprises the salt lithium iodide dissolved in the organic solvent mixture comprising 1,3-dioxolane (DX), 1,2-dimethoxyethane (DME), and small amount of 3,5 dimethylisoxazole (DMI). (col. 6, lines 44-48.)

In US 2007/0202409 A1 (Yamakawa) it is stated with reference to the electrolyte solvent for the $Li/FeS_2$ cell at para. 33: "Examples of the organic solvent include propylene carbonate, ethylene carbonate, 1,2-dimethoxy ethane, γ-butyrolactone, tetrahydrofuran, 2-methyltetrahydrofuran, 1,3-dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the $Li/FeS_2$ cell depending on the particular lithium salt to be dissolved in the solvent. (See, e.g. above U.S. Pat. No. 5,290,414 and U.S. Pat. No. 6,849,360) The reference Yamakawa does not teach which combination of solvents from the above list are to be used with any given lithium salt.

In U.S. 2006/0046152 (Webber) is disclosed an electrolyte system for a lithium cell which may have a cathode comprising $FeS_2$ and FeS therein. The disclosed electrolyte contains lithium iodide salt dissolved in a solvent system comprising a mixture of 1,2-dimethoxypropane and 1,2-dimethoxyethane.

The choice of a particular organic solvent or mixture of different organic solvents for use in conjunction with any one or more lithium salts to produce a suitable electrolyte for the $Li/FeS_2$ cell is challenging. This is not to say that many combinations of lithium salts and organic solvents do not produce a $Li/FeS_2$ cell will not work at all. But rather the challenge associated with such cells using an electrolyte formed with just any combination of known lithium salt and organic solvent is that the problems encountered will likely be very substantial, thus making the cell impractical for commercial usage. The history of development of lithium cells in general, whether lithium primary cells, e.g. non rechargeable $Li/MnO_2$ or $Li/FeS_2$ cells or rechargeable lithium or lithium ion cells reveals that just any combination of lithium salt and organic solvent cannot be expected to result in a good cell, that is, exhibiting good, reliable performance. Thus, references which merely provide long lists of possible organic solvents for $Li/FeS_2$ cells do not necessarily teach combinations of solvents or combination of specific lithium salts in specific solvent mixtures, which exhibit particular or unexpected benefit.

It is desired to produce a lithium cell which has anode comprising lithium or lithium alloy and a cathode comprising iron disulfide ($FeS_2$) and another coactive (dischargeable) material therein, preferably iron sulfide (FeS). It has been determined that adding a coactive material in admixture with the $FeS_2$ can lead to certain benefits in terms of cathode preparation without any significant sacrifice in cell performance when the cell is used in normal service, for example, to power digital cameras. It has been determined by Applicants herein that the addition of iron sulfide (FeS) powder in admixture with iron disulfide ($FeS_2$) can result in a desirable lithium cell. Such cell can be represented hereinafter as a $Li/(FeS_2+FeS)$ cell.

Accordingly, it is desired to find an electrolyte system which is effective in a cell having a lithium anode and a cathode comprising a mixture of $FeS_2$ and FeS coactive materials, $Li/(FeS_2+FeS)$ cell, wherein the electrolyte enables the cell with high performance and high rate discharge capability as well as reliable use.

Accordingly, it is desired to produce a $Li/(FeS_2+FeS)$ cell employing an effective electrolyte therein which promotes ionization of the lithium salt in the electrolyte and is sufficiently stable that it does not degrade with time and does not degrade the anode or cathode, or other cell components.

It is desired that the electrolyte comprising a lithium salt dissolved in an organic solvent provide for good ionic mobility of the lithium ions through the electrolyte so that the lithium ions may pass at good transport rate from anode to cathode through the separator.

It is desired to produce a primary (nonrechargeable) $Li/(FeS_2+FeS)$ cell having good power capability that the cell may be used in place of rechargeable batteries to power digital cameras and similar electronic devices.

SUMMARY OF THE INVENTION

The invention is directed to lithium primary cells wherein the anode comprises lithium metal. The lithium may be alloyed with small amounts of other metal, for example aluminum, which typically comprises less than about 1 or 2 wt. % of the lithium alloy. The lithium which forms the anode active material, is preferably in the form of a thin foil. The cell has a cathode comprising the cathode active material iron disulfide ($FeS_2$), commonly known as "pyrite" and at least one other cathode active material (coactive) compatible with $FeS_2$. Each cathode coactive material must be dischargeable, that is, must participate in useful electrochemical reaction in order to produce useful electrical energy when the cell is used in normal service. By compatible cathode coactive material is meant that it does not react directly with $FeS_2$ or other coactive materials in direct oxidation-reduction or other reaction, thus losing all or a substantial amount of its electrochemical capacity. Additionally, the coactive material should be stable in the electrolyte and not react with any of the cathode additives or cathode current collector or any other of the cell components. All of the cathode coactive materials should have same or similar OCV (open circuit voltage) within about 10 percent. The OCV of each cathode coactive material against the lithium anode desirably should be between about 1.7 and 1.8 volts so that it is closely compatible with $FeS_2$, which has an OCV (fresh) of about 1.75 volt. In the lithium cell the cathode containing $FeS_2$ and a coactive material should exhibit a similar load voltage profile as the same cell with only $FeS_2$ as cathode active material (within about 10 percent) when the cell is discharged against the same load. Desirably the lithium cell with cathode comprising $FeS_2$ and coactive material should exhibit a load voltage discharge profile between 0.9 and 1.7 volts when the cell is discharged in normal service, for example, in powering a digital camera.

In a principal aspect it has been determined that a cell with a lithium anode and a cathode comprising $FeS_2$ (iron disulfide) powder and a coactive material, namely, FeS (iron sulfide) powder results in a cell with excellent discharge properties with specific electrolytes. When the cell is used in normal service, for example, to power a digital camera and the like, the lithium cell of the invention with cathode comprising $FeS_2$ and FeS as cathode active material has similar discharge properties and voltage profile as the same cell with only $FeS_2$ as the cathode active material. This may be as the result of a higher efficiency of discharge of the $FeS_2$ in combination with FeS at high power discharge service as in digital cameras, since the specific theoretical capacity of FeS is 609.8 mAmp-hr/gram, whereas the specific theoretical capacity of $FeS_2$ is higher at 893.6 mAmp-hr/gram.

The FeS is a much softer material than $FeS_2$. For example, $FeS_2$ has a hardness of between about 6 and 6.5 on the Mohr scale while FeS has a hardness of between about 3.5 and 4.5 on the Mohr scale. Because FeS is a softer material than $FeS_2$, it is much easier to grind the FeS to desired small particle size using conventional ball grinding media. It is thus easier to produce the desired average particle size and desired particle size distribution when grinding the softer FeS material. Also since FeS is much softer material much less heat is generated in grinding the FeS material to the desired particle size than in grinding the $FeS_2$ to same size. This results in a safer grinding operation with fewer safeguards and controls required in grinding FeS material, since the FeS particles are less prone to ignite than $FeS_2$ during the grinding operation because there is less heat produced. Thus the expense of producing a batch of mixed FeS and $FeS_2$ of given particle size is reduced compared to producing the same weight and same particle size of $FeS_2$. Also this results in easier preparation of the cathode slurry as the particle size of the mixture of cathode actives may be more readily controlled. It is speculated that the softer FeS particles could also be a factor promoting improved conductivity of the cathode which in turn results in higher efficiency of discharge of the $FeS_2$ in combination with FeS at high power discharge service.

In an aspect of the invention the cell has an anode comprising lithium metal or lithium metal alloy and a cathode comprising a mixture of $FeS_2$ and FeS cathode active materials. The FeS content desirably comprises between about 5 and 30 percent by weight of the total of $FeS_2$ and FeS in the cathode, irrespective of the electrolyte employed. Typically the $FeS_2$ and FeS may have a bimodal particle size distribution. Preferably the $FeS_2$ has an average median ($D_{50}$) particle size between about 20 and 35 micron and the FeS has an average median ($D_{50}$) particle size between about 5 and 15 micron, irrespective of the electrolyte employed. The total $FeS_2$ plus FeS content in the dry cathode coating may typically comprise between about 83 and 94 percent by weight of the dry cathode, preferably between about 88 and 93 percent by weight of the dry cathode.

The cell may be in the form of a button (coin) cell or flat cell. Desirably the cell may be in the form of a spirally wound cell comprising an anode sheet and a cathode composite sheet spirally wound with separator therebetween. The cathode sheet is produced using a slurry process to coat a cathode mixture comprising iron disulfide ($FeS_2$) and iron sulfide (FeS) particles onto a conductive surface which can be a conductive metal substrate. The $FeS_2$ and FeS particles are bound to the conductive substrate using desirably an elastomeric, preferably, a styrene-ethylene/butylene-styrene (SEBS) block copolymer such as Kraton G1651 elastomer (Kraton Polymers, Houston, Tex.). This polymer is a film-former, and possesses good affinity and cohesive properties for the $FeS_2$ and FeS particles as well as for conductive carbon particle additives in the cathode mixture.

In an aspect of the invention the cathode is formed of a cathode slurry comprising a mixture of iron disulfide ($FeS_2$) powder and iron sulfide (FeS) powder. The cathode slurry further includes conductive carbon particles, binder material, and solvent. (The term "slurry" as used herein will have its ordinary dictionary meaning and thus be understood to mean a suspension comprising solid particles in liquid.) The wet cathode slurry is coated onto a conductive substrate such as a sheet of aluminum or stainless steel. The conductive substrate functions as a cathode current collector. The solvent is then evaporated leaving dry cathode coating mixture comprising the iron disulfide ($FeS_2$) and iron sulfide (FeS) as well as carbon particles preferably including carbon black adhesively bound to each other and with the dry coating bound to the conductive substrate. The preferred carbon black is acetylene black. The carbon particles may optionally include graphite particles blended therein.

After the wet cathode slurry is coated onto the conductive substrate, the coated substrate is placed in an oven and heated at elevated temperatures until the solvent evaporates, as disclosed in commonly assigned U.S. patent application Ser. No. 11/516,534, filed Sep. 6, 2006. The resulting product is a dry cathode coating comprising iron disulfide and carbon particles bound to the conductive substrate. On a dry basis, the cathode preferably contains between 83 and 94%, preferably between about 88 and 93% by weight of cathode active material, preferably $FeS_2$ plus FeS. The solids content, that is, the $FeS_2$ and FeS particles (or other coactives) and conductive carbon particles and binder in the wet cathode slurry is between 50 and 75 percent by weight. The viscosity range for the cathode slurry is from about 3500 to 30000 mPas. (mPas=mNewton×sec/m²=1 centipoise). After the anode comprising lithium metal and cathode comprising iron disulfide, with separator therebetween, are inserted into the cell housing, an electrolyte is added to the cell.

A preferred electrolyte for the cell of the invention comprising lithium anode and cathode comprising a mixture of $FeS_2$ and FeS (Li/FeS2+FeS) cell is preferably composed of between about 0.1 and 1.0 molar (mol/liter), preferably about 0.8 molar (0.8 mol/liter) concentration of a lithium salt such as lithium bistrifluoromethylsulfonyl imide, $Li(CF_3SO_2)_2N$ (LiTFSI) salt or lithium iodide or mixtures thereof dissolved in a solvent mixture comprising between about 75 and 85 vol%, preferably about 80 vol.% 1,3-dioxolane (DX) and between about 15 and 25 vol% sulfolane, preferably about 20 vol.% sulfolane (SL). Then about 0.1 percent by weight pyridine may be added to form the final electrolyte solution. The pyridine functions primarily to prevent or retard the rate of polymerization of the dioxolane. The FeS content in said cathode desirably comprises between about 5 and 30 percent by weight of FeS plus $FeS_2$ in said cathode. Such electrolyte as applied to Li/$FeS_2$ cells is disclosed in commonly assigned International Application Publication WO 2008/012776 A2. This latter reference discloses a cell with a lithium anode and cathode comprising FeS$_2$ active material. It does not disclose adding FeS in mixture with the FeS$_2$ in the cathode.

The preferred electrolyte solvents 1,3-dioxolane and sulfolane have the following chemical and structural formulas:

1,3-dioxolane (DX) is a cyclic diether, also classified as a heterocyclic acetal. It has the chemical formula C$_3$H$_6$O$_2$ and the structural formula (I):

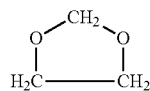
(I)

Sulfolane is a cyclic compound having the molecular formula C$_4$H$_8$O$_2$S and a Chemical Abstracts Service Registry (CAS) No. 126-33-0, Sulfolane is a clear colorless liquid having a boiling point of 285° C., a viscosity of 10.28 centipoise (at 30° C.), and a dielectric constant of 43.26 (at 30° C.). The structural formula for sulfolane is represented as follows:

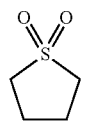
(II)

Other electrolyte systems can be very effective for cells having a lithium anode and a cathode comprising a mixture of FeS$_2$ and FeS powder. The FeS content in said cathode desirably comprises between about 5 and 30 percent by weight of FeS plus FeS$_2$ in said cathode. One such electrolyte is an electrolyte solution comprising a mixture of lithium iodide (LiI) salt dissolved in a mixture of dioxolane (DX), dimethoxyethane (DME), and sulfolane as disclosed in commonly assigned copending U.S. patent application Ser. No. 12/069,953, filed Feb. 14, 2008. This reference discloses a cell with a lithium anode and cathode comprising FeS$_2$ active material. It does not disclose adding FeS in mixture with the FeS$_2$. The dioxolane is preferably 1,3-dioxolane but the term dioxolane may include alkyl substituted dioxolanes. The preferred dimethoxyethane is 1,2-dimethoxyethane. This electrolyte may also optionally includes 3,5-dimethylisoxazole (DMI) in amount between about 0.1 and 1 wt. % of the solvent mixture to retard the rate of dioxolane polymerization. The weight ratio of dioxolane to dimethoxyethane as taught in U.S. application Ser. No. 12/069,953 is in a range between about 0.82 and 9.0, desirably between about 0.82 and 2.3. This same range can be applicable to lithium cells with cathodes having a mixture of coactives FeS$_2$ and FeS. The sulfolane content in the latter electrolyte may comprise greater than about 4.8 wt % of the solvent mixture. The sulfolane may also be present in higher amount, for example, up to about 25 wt % of the above indicated solvent mixture wherein the weight ratio of dioxolane to dimethoxyethane is in a range between about 0.82 and 9.0. Preferably, the sulfolane may comprise between about 4.8 and 6.0 wt % of the solvent mixture. These same ranges can be applicable to lithium cells with cathodes having a mixture of coactives FeS$_2$ and FeS. The electrolyte has a viscosity desirably between about 0.9 and 1.5 centipoise. The water content in the electrolyte may be between about 100 and 2000 parts by weight water per million parts by weight electrolyte. Desirably the water content in the electrolyte may be between about 600 and 2000 parts by weight water per million parts by weight electrolyte. The electrolyte may contain between about 600 and 1000 parts by weight water per million parts by weight electrolyte, desirably between about 100 and 300 parts by weight water per million parts by weight electrolyte.

1,2-demethoxyethane (DME) in the latter electrolyte is a water white liquid with boiling point 85.2° C., a viscosity of about 0.455 centipoise and a dielectric constant of 7.20. It has a Chemical Abstracts Service Registry CAS No. 110-71-4. 1,2-dimethoxyethane (DME) (also known as ethylene glycoldimethylether) is an acyclic (non cyclic) organic solvent of structural formula:

$$CH_3OCH_2CH_2OCH_3 \qquad (III)$$

Although sulfolane is preferred in the latter electrolyte, other solvents with similarly high dielectric constant can be employed in place of sulfolane. Such solvents are propylene carbonate, ethylene carbonate, 3-methyl-2-oxazolidone, γ-butyrolactone, dimethylsulfoxide, dimethylsulfite, ethylene glycol sulfite, acetonitrile, N-methylpyrrolidinone or combinations thereof.

In general the water content of the cell of the invention having a lithium anode and cathode comprising a mixture of FeS$_2$ and FeS cathode active materials may typically be less than about 100 parts water per million parts total electrolyte. However, based on favorable test results as reported in related cells having a lithium anode and cathode with FeS$_2$ active material (See commonly assigned patent application Ser. No. 12/009,858, Filed Jan. 23, 2008) it is expected that the water content in the total electrolyte may be greater than 100 ppm for lithium cells having a mixture of FeS$_2$ and FeS active material in the cathode. It is believed that water (deionized) may be added to the electrolyte solvents so that the water content in the electrolyte for the Li/(FeS$_2$+FeS) cell may be up to about 1000 ppm and even up to about 2000 ppm. (See commonly assigned patent application Ser. No. 12/009,858, filed Jan. 23, 2008 discussing water content in a Li/FeS$_2$ cell.) Thus it is believed that the water content in the electrolyte for the Li/(FeS$_2$+FeS) cell herein may be between about 100 and 1000 ppm, for example, between about 500 and 1000 ppm, or between about 600 and 1000 ppm and up to about 2000 ppm, for example, between about 600 and 2000 ppm. A preferred level of water content in the electrolyte for the Li/(FeS$_2$+FeS) cell is between about 100 and 300 ppm.

Another desired electrolyte for the lithium/(FeS$_2$+FeS) cell herein comprises a lithium salt dissolved in an organic solvent mixture of the type described in commonly assigned U.S. patent application Ser. No. 12/070,924, filed Feb. 22, 2008. The electrolyte as described in this reference is applied to lithium cell with a cathode comprising FeS$_2$, with no specific mention of adding FeS to the cathode mixture. It is believed herein that the same electrolyte can be used very effectively for lithium cells having a cathode comprising the cathode active materials FeS and FeS$_2$ in admixture. The content of the FeS in the cathode may desirably be between about 5 and 30 percent by weight of FeS$_2$ plus FeS in the cathode. A preferred electrolyte to which the additive of the invention may be added comprises a lithium salt dissolved in a solvent mixture comprising 1,3-dioxolane and sulfolane. The lithium salt may be selected from LiCF$_3$SO$_3$ (LiTFS), Li(CF$_3$SO$_2$)$_2$N (LiTFSI), LiI, LiPF$_6$, LiBr, and LiBF$_6$. Desirably the lithium salt comprises LiCF$_3$SO$_3$ (LiTFS) or Li(CF$_3$SO$_2$)$_2$N (LiTFSI), preferably Li(CF$_3$SO$_2$)$_2$N (LiTFSI). The electrolyte solvent mixture comprising 1,3-dioxolane and sulfolane, preferably comprising between about 70 and 90 vol % 1,3-dioxolane and between about 10 and 30 vol % sulfolane. As recited in U.S. application Ser. No. 12/070,924 an additive which is alkylpyrazole or alkylimidazole or mixture thereof can be added in small amount to this electrolyte to help retard the rate of buildup of a deleterious passivation layer on the lithium anode surface as well as prevent or reduce the rate of polymerization of the dioxolane. This in turn improves performance of the cell. The electrolyte additive comprising said alkylpyrazole or alkylimidazole or mixtures thereof comprises between about 0.05 to 1 wt. %, preferably between about 0.1 and 1.0 wt % of the total electrolyte. The alkylpyrazole preferably comprises 1,3-dimethylpyrozole or 1,3,5-trimethylpyrozole or mixtures thereof. The alkylimidazole preferably comprises 1,2-dimethylimidazole. These alkylpyrazole and alkylimidazole additives may be added to the above electrolyte system and used in the Li/(FeS$_2$+FeS) cell.

The preferred alkylpyrazole additive, namely, 1,3-dimethylpyrozole or 1,3,5-trimethylpyrozole, and preferred alkylimidazole, namely 1,2-dimethylimidazole, as referenced in the above electrolyte, have the following chemical and structural formulas:

1,3-dimethylpyrozole is a cyclic compound having the molecular formula $C_5H_8N_2$. The structural formula is represented as follows:

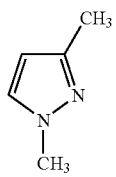

(IV)

1,3,5-trimethylpyrozole, as referenced in the above electrolyte, is a cyclic compound having the molecular formula $C_6H_{10}N_2$. It has a Chemical Abstracts Service Registry No. (CAS) 1072-91-9. The structural formula is represented as follows:

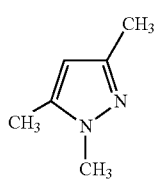

(V)

1,2-dimethylimidazole additive, as referenced in the above electrolyte, is a cyclic compound having the molecular formula $C_5H_8N_2$. (Abstracts Registry CAS No. 1739-84-0) The structural formula is represented as follows:

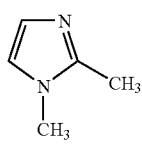

(VI)

Another preferred electrolyte for the primary Li/(FeS$_2$+FeS) cell comprises the lithium salt lithium bistrifluoromethylsulfonyl imide, Li(CF$_3$SO$_2$)$_2$N (LiTFSI), which is dissolved in a solvent mixture comprising 1,3-dioxolane and tetrahydrofuran (THF). Such electrolyte is disclosed with respect to a Li/FeS$_2$ cell in commonly assigned U.S. application Ser. No. 11/821,464, filed on Jun. 22, 2007. (There is no disclosure in this latter application of adding FeS to the cathode in admixture with FeS$_2$.)

Another preferred electrolyte for the primary Li/(FeS$_2$+FeS) cell comprises the lithium salt lithium bistrifluoromethylsulfonyl imide, Li(CF$_3$SO$_2$)$_2$N (LiTFSI) or lithium iodide (LiI), which is dissolved in a solvent mixture comprising 1,2-dimethoxyethane (DME) and sulfolane with SnI$_2$ also added to the electrolyte. Such electrolyte system with SnI$_2$ additive is disclosed in commonly assigned U.S. application Ser. No. 11/879,097, filed Jul. 16, 2007. The electrolyte as described in this reference is applied to a lithium cell with a cathode comprising FeS$_2$, with no specific mention of adding FeS to the cathode mixture. However, the electrolyte systems as described in this reference with SnI$_2$ additive therein is also be an effective electrolyte for the Li/(FeS$_2$+FeS) cell. A preferred electrolyte may comprise 0.8 moles per liter of the lithium salt Li(CF$_3$SO$_2$)$_2$N (LITFSI) dissolved in a 80:20 volume ratio of 1,2-dimethoxyethane DME to sulfolane with about 3200 ppm by weight of SnI$_2$ also added to the electrolyte. Another preferred electrolyte, for example, may comprise 1.0 moles per liter of the lithium iodide (LiI) salt dissolved in a 80:20 volume ratio of 1,2-dimethoxyethane (DME) to sulfolane with about 3300 ppm by weight of SnI$_2$ also added to the electrolyte. The electrolyte may contain Li(CF$_3$SO$_2$)$_2$N (LiTFSI) salt or lithium iodide (LiI) dissolved in solvent mixture comprising 1,2-dimethoxyethane (DME) in amount between about 50 and 95 vol. percent and sulfolane in amount between about 5 and 50 vol. percent and SnI$_2$ added desirably in amount between about 1000 and 5000 ppm of the total electrolyte. Typically the SnI$_2$ comprises between about 1000 and 4000 ppm, for example, between about 2000 and 4000 ppm of the electrolyte. The presence of the SnI$_2$ in the electrolyte prevents or at least retards the rate of continued buildup of the passivation layer. That is, the presence of the SnI$_2$ in the electrolyte tends to stabilize the passivation layer either by retarding its rate of buildup or preventing continued and unabated buildup of the passivation layer on the surface of the lithium anode. These electrolyte systems containing the SnI$_2$ additive can all be usefully applied to the Li/(FeS$_2$+FeS) cell. The electrolyte can improve cell performance and capacity of the primary Li/(FeS$_2$ and FeS) cell in part because of the beneficial effect of the SnI2 additive in retarding the rate of buildup of a deleterious passivation layer on the lithium anode surface.

The lithium salt in the above electrolytes containing SnI$_2$ additive may comprise lithium trifluoromethane sulfonate, LiCF$_3$SO$_3$ (LiTFS) as a substitute for the lithium bistrifluoromethylsulfonyl imide, Li(CF$_3$SO$_2$)$_2$N (LiTFSI) or in admixture with the LiTFSI, but the latter is a preferred lithium salt.

The above electrolyte mixtures containing SnI$_2$ additive may be free of any dioxolane. That is, the above electrolyte solvent mixtures containing SnI$_2$ additive may contain only trace amounts of any dioxolane, for example, 1,3-dioxolane or other dioxolane including alkyl-substituted dioxolanes, such as but not limited to methyldioxolane and diethyldioxolane, and mixtures thereof. Thus, the term dioxolane as used herein shall be understood to include 1,3-dioxolane and alkyl-substituted dioxolanes and mixtures thereof. Such trace amount of dioxolanes in total may comprise, less than 200 ppm of the solvent mixture, e.g. less than 100 ppm or, e.g., less than 50 ppm of the solvent mixture. At such low concentrations (and even at somewhat higher amount) such trace amounts of the dioxolanes would not be expected to serve any particular or substantive function. Thus, the term electrolyte solvent mixture being "essentially free" of dioxolane as used herein shall be understood to refer to such trace amount of dioxolanes in total which may be present in the electrolyte solvent, but is present in such small (trace) amounts that it would serve no particular or substantive function.

The above indicated electrolyte systems provide the electrochemical properties needed to allow efficient electrochemical discharge of the Li/(FeS$_2$+FeS) cell. In particular these electrolyte systems provide the electrochemical properties needed to satisfy the high rate pulsed discharge demands of high power electronic devices such as digital cameras. The suitability of the above named electrolyte systems for the lithium cell with cathode comprising FeS$_2$ and FeS in admixture is based partially on theoretical considerations and the experience gained from the testing of these electrolyte systems in Li/FeS$_2$ cells.

The above indicated electrolyte systems also has the advantage of having low viscosity. In a Li/(FeS$_2$+FeS) cell as in the Li/FeS$_2$ cell it is advantageous to have an electrolyte of relatively low viscosity, desirably between about 0.9 and 1.5 centipoise. The use of electrolyte solvents for Li/FeS$_2$ or Li(FeS$_2$+FeS) cells with higher viscosity does not necessarily mean that the electrolyte will result in an inoperable or poor cell. Nevertheless, applicants believe that electrolyte solvents of low viscosity will more likely result in beneficial properties for the Li/(FeS$_2$+FeS) cell.

In order for the Li/(FeS$_2$+FeS) cell to discharge properly lithium ions (Li$^+$) from the anode must have enough ionic mobility enabling good transport across the separator and into the cathode. At the cathode the lithium ions participate in the reduction reaction of sulfur ions from FeS$_2$ producing Li$_2$S at the cathode. The reason that electrolytes of low viscosity are highly desirable for the Li/(FeS$_2$+FeS) cell is 1) that it reduces lithium ion (Li$^+$) concentration polarization within the electrolyte and 2) it promotes good lithium ion (Li$^+$) transport mobility during discharge. In particular the low viscosity electrolyte for the Li/(FeS$_2$+FeS) cell reduces lithium ion concentration polarization and promotes better lithium ion transport from anode to cathode when the cell is discharged at high pulsed rate, for example, when the Li/(FeS$_2$+FeS) cell is used to power a digital camera. Lithium ion concentration polarization is characterized by the concentration gradient present between the Li anode and the FeS$_2$ cathode as the lithium ion transports from anode to cathode. A high lithium ion concentration gradient is an indicator of a poor rate of lithium ion transport and is more apt to occur when the electrolyte has a high viscosity. When the electrolyte has a high viscosity, lithium ions tend to buildup at or near the anode surface during cell discharge, while the supply of lithium ions at the cathode surface becomes much less by comparison, thus resulting in a high lithium ion concentration gradient.

A low viscosity electrolyte for the Li/(FeS$_2$+FeS) cell is desirable in that it can reduce the lithium ion buildup at the anode and thus reduces the level of lithium ion concentration gradient between anode and cathode. The low viscosity of the electrolyte improves the lithium ion (Li$^+$) mobility, namely, the rate of transport of lithium ions from anode to cathode. As a result of the increased lithium ion mobility the performance of the Li/(FeS$_2$+FeS) cell can improve, especially at high rate discharge conditions.

The electrolyte may desirably be added to the Li/(FeS$_2$+FeS) cell in amount equal to about 0.4 gram electrolyte solution per gram mixture of FeS$_2$ plus FeS.

The above indicated electrolytes may be beneficially employed in a coin (button) cell or wound cell for the Li/(FeS$_2$+FeS) cell system.

DETAILED DESCRIPTION

Figure 1:
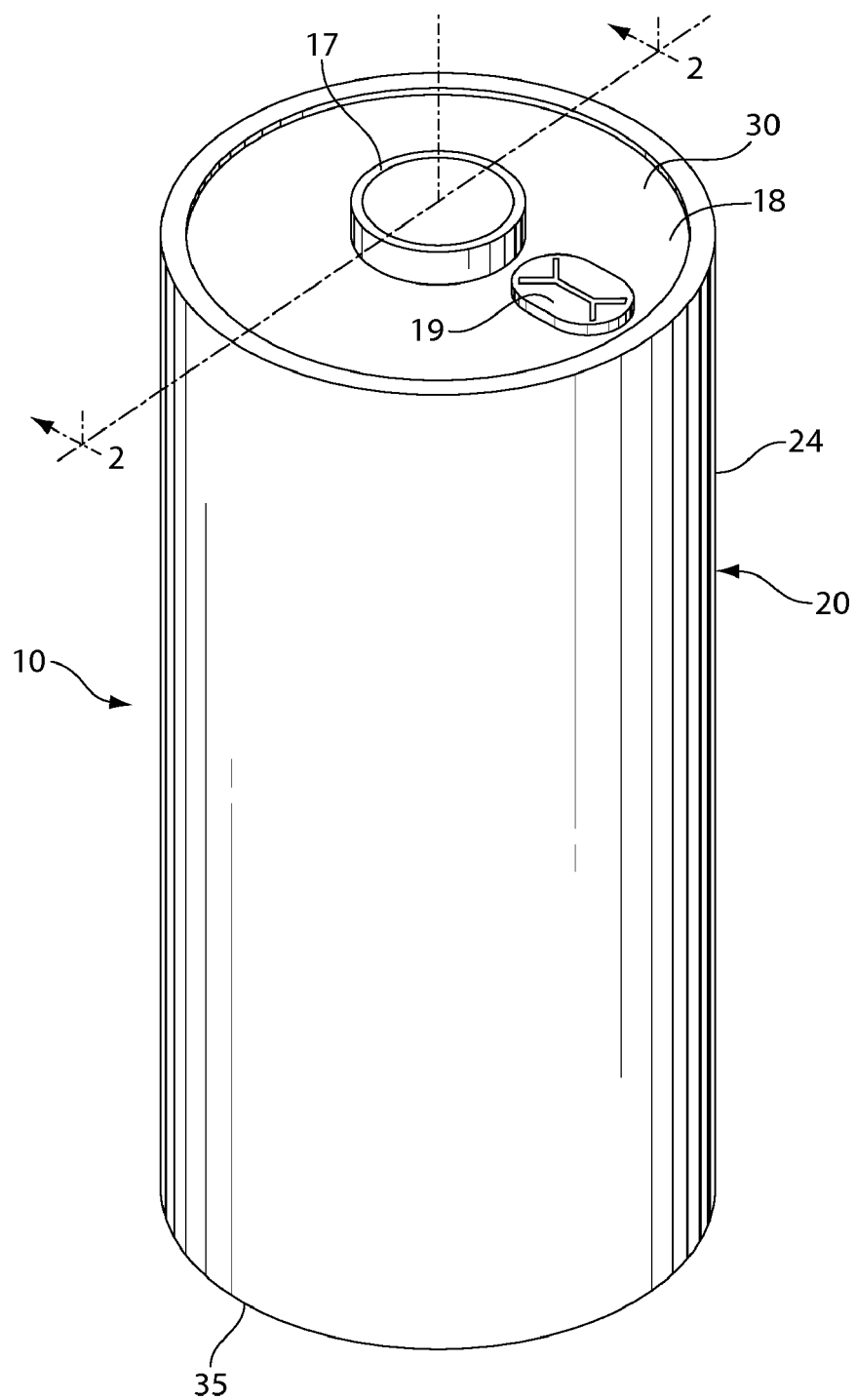
FIG. 1 is a pictorial view of an improved Li/FeS$_2$ cell of the invention as presented in a cylindrical cell embodiment.

The cell of the invention having a lithium anode and cathode comprising FeS$_2$ and FeS therein (Li/(FeS$_2$+FeS) cell) may be in the form of a flat button (coin) cell or a spirally wound cell. A desirable button cell 100 configuration comprising a lithium anode 150 and a cathode 170 comprising FeS$_2$ and FeS with separator 160 between the anode and cathode is shown in FIG. 1A.

The Li/(FeS$_2$+FeS) cell as in cell 100 has the following basic discharge reactions assuming that FeS$_2$ and FeS are in equal molar amounts (one step mechanism):

Anode:

| 4Li=4Li$^+$+4$e$ | Eq. 1 |

| 2Li=2Li++2$e$ | Eq. 1A |

Cathode:

| FeS$_2$+4Li$^+$+4$e$=Fe+2Li$_2$S | Eq. 2 |

| FeS+2Li$^+$+2$e$=Fe+2Li$_2$S | Eq.2A |

Overall:

| FeS$_2$+FeS+6Li=2Fe+3Li$_2$S | Eq. 3 |

An embodiment of a Li/(FeS$_2$+FeS) button (coin) cell 100 of the invention is shown in FIG. 1A. Cell 100 is a primary (nonrechargeable) cell. In the button cell 100 (FIG. 1A) a disk-shaped cylindrical cathode housing 130 is formed having an open end 132 and a closed end 138. Cathode housing 130 is preferably formed from nickel-plated steel. An electrical insulating member 140, preferably a plastic cylindrical member of disk shape having a hollow core, can be inserted into housing 130 so that the outside surface of insulating member 140 abuts and lines the inside surface of cathode housing 130 side walls 136. Alternatively, the inside surface of side walls 136 may be coated with a polymeric material that solidifies into insulator 140 abutting the inside surface of housing 130. Insulator 140 may first be fitted over the side walls 122 of the anode housing 120 before insertion into cathode housing 130. Insulator 140 can be formed from a variety of thermally stable insulating materials, but is preferably formed of polypropylene.

The cathode 170 comprising a mixture of iron disulfide (FeS$_2$) and iron sulfide (FeS) powder dispersed therein, can be prepared in the form of a slurry which may be coated directly onto at least one side of conductive substrate sheet 165 which is desirably a sheet of aluminum, aluminum alloy, or stainless steel. The cathode 170 in the form of a slurry, for example, having the representative formulation as in Table 1, may be coated onto just one side of the conductive substrate 165, then dried to from the final cathode. The coated cathode is then passed between calendering rolls to obtain the desired dry cathode thicknesses. If a perforated substrate 165 is desired then it is best to coat the slurry onto both sides of the substrate 165 so that it may be calendered more easily without curl. The finished cathode 170 can be stored in sheets until ready for insertion into the cell housing. The conductive substrate 165 onto which the cathode 170 slurry is coated, desirably of aluminum, aluminum alloy, or stainless steel may be a solid sheet or have a plurality of small apertures therein, thus forming a grid or screen. For example, the conductive substrate sheet may be a sheet of stainless steel, in the form of expanded stainless steel metal foil, having a plurality of small apertures or perforations therein. In a preferred embodiment the cathode slurry 170 is coated onto one side of a conductive sheet 165 which may be a solid sheet of aluminum or aluminum alloy without any apertures therethrough. The coated cathode is then passed between calendering rolls to obtain the desired dry cathode thicknesses.

The cathode slurry comprises 2 to 4 wt % of binder (Kraton G1651 elastomeric binder from Kraton Polymers, Houston Tex.); 50 to 70 wt % comprising a mixture of active FeS$_2$ and FeS powder; 4 to 7 wt % of conductive carbon (carbon black and graphite); and 25 to 45 wt % of solvent(s). The FeS content desirably comprises between about 5 and 30 percent by weight of the mixture of FeS$_2$ and FeS powder. The total FeS$_2$ plus FeS content may typically comprise between about 83 and 94 percent by weight of the dry cathode, preferably between about 88 and 93 percent by weight of the dry cathode. (The carbon black may include in whole or in part acetylene black carbon particles. Thus, the term carbon black as used herein shall be understood to extend to and include carbon black and acetylene black carbon particles.) The Kraton G1651 binder is an elastomeric block copolymer (styrene-ethylene/butylene (SEBS) block copolymer) which is a film-former. This binder possesses sufficient affinity for the active FeS$_2$, FeS, and conductive carbon particles to facilitate preparation of the wet cathode slurry and to keep these particles in contact with each other after the solvents are evaporated.

The FeS$_2$ powder may have an average particle size between about 1 and 100 micron, desirably between about 10 and 50 micron and a BET surface area typically between about 0.8 and 1.5 m$^2$/g. The FeS powder may have an average particle size between about 1 and 100 micron, desirably between about 5 and 50 micron. Preferably the FeS$_2$ powder has a particle size between about 20 and 35 micron and the FeS powder has a particle size between about 5 and 15 micron. A desirable FeS$_2$ powder is available under the trade designation Pyrox Red 325 powder from Chemetall GmbH, wherein the FeS$_2$ powder has a particle size sufficiently small that at least 90% of particles will pass through a sieve of Tyler mesh size 325 (sieve openings of 0.045 mm). (The residue amount of FeS$_2$ particles not passing through the 325 mesh sieve is 10% max.) The Pyrox Red 325 FeS$_2$ had an average particle size of between about 20 and 26 micron and a typical BET surface area of about 1.1 m$^2$/g and density of 4.7 gm/cm$^3$. A desirable FeS powder is available from Alfa Aesar Co., having a purity of 99.9%. Conventional FeS$_2$ powders, for example Pyrox Red 325 powder from Chemetall GmbH, are commercially available with pH raising additives therein. Such additives may possibly include calcium carbonate (CaCO$_3$) or calcium carbonate containing compounds. Similarly such compounds may also be added to FeS powder to elevate the pH of this powder as well. The stored FeS$_2$ and FeS powder as well as cathodes based on FeS$_2$ and FeS active material can gradually react with atmospheric air and moisture resulting in formation of sulfuric acid and other acidic byproducts. Some of these byproducts are capable of promoting formation of dendrites, which can all reduce cell life and can interfere with attainment of good cell performance during normal cell usage. It is thus desirable to elevate the pH of the FeS$_2$ and FeS powder in order to retard or the formation of such acidic contaminants if the powder is to be stored in an atmosphere containing air and moisture.

A suitable graphite is available under the trade designation TIMREX KS6 graphite from Timcal America. TIMREX graphite is a fairly high crystalline synthetic graphite, BET surface area 20 m$^2$/g, density 2.25 g/cm$^3$. (Other graphites may be employed selected from natural, synthetic, or expanded graphite and mixtures thereof, but the TIMREX graphite from Timcal is preferred because of its high purity.) The carbon black is preferably an acetylene black available under the trade designation Super P conductive carbon black (BET surface area of 62 m$^2$/g, bulk density in bag 0.160 g/cm$^3$) from Timcal Co. Super P acetylene black has a pH of about 10 as measured by ASTM D1512-95.

A preferred cathode slurry mixture is presented in Table 1:

TABLE I

| Cathode Composition | | |
|---|---|---|
| | Wet Cathode Slurry (wt. %) | Dry Cathode (wt. %) |
| Binder (Kraton G1651) | 1.4 | 2.1 |
| Hydrocarbon Solvent (ShellSol A100) | 13.4 | 0.0 |
| (ShellSol OMS) | 20.2 | 0.0 |
| FeS$_2$ Powder (Pyrox Red 325) | 46.9 | 70.6 |
| FeS Powder | 13.9 | 20.9 |
| Graphite (Timrex KS6) | 3.0 | 4.6 |
| Acetylene Carbon Black (Super P) | 1.2 | 1.8 |
| Total | 100.0 | 100.00 |

A similar wet cathode slurry mixture, but without any FeS, (electrolyte not yet added to the cell) is disclosed in commonly (assigned application Ser. No. 11/516,534, filed Sep. 6, 2006. The total solids content of the wet cathode slurry mixture 170 is shown in above Table 1 is 66.4 wt. %

In preparation of button cells 100 (20 mm diameter and a thickness of about 3 mm) a wet cathode slurry 170 containing a mixture of FeS$_2$ and FeS active material, for example, of composition as in Table 1, is coated onto one side of an aluminum substrate 165. The aluminum sheet in this embodiment is a solid sheet without any perforations therein. The wet cathode slurry 170 is coated onto the conductive substrate 165 using intermittent roll coating technique. The cathode slurry coated on the conductive substrate is dried in a continuous mode, adjusting or ramping up the temperature from an initial temperature of 40° C. to a final temperature of about 130° C. in an oven until the solvent has all evaporated. This forms a dry cathode coating 170 comprising $FeS_2$ and FeS particles, carbon particles, and binder on the conductive substrate 165. The dry cathode coating may be subjected to calendering resulting in a representative desirable thickness of the dry cathode 170 typically between about 0.170 and 0.186 mm. This includes a thickness of the aluminum substrate 165 of between about 0.015 and 0.040 mm thickness, typically of about 0.038 mm thickness. A durable dry cathode 170 sheet is thus formed in this manner. The cathode 170 sheet may be set aside until ready to be cut to proper size for insertion into the cell housing.

There can be variations in the sequence of assembling and loading the cell contents into the cell housing. However it has been determined that button cell 100 can be conveniently assembled in the following manner to form a completed cell suitable for use or testing:

Cell 100 can be formed conveniently by loading the anode housing 120, preferably of nickel plated steel, with all of the necessary cell components, including the electrolyte. Then the cathode housing 130, preferably of aluminum plated steel, can be inserted and crimped over the anode housing 120 to tightly close the cell. Thus, a durable cell 100, can be assembled by first inserting insulator disk 142, preferably of polypropylene, over the anode housing 120 so that it covers the side walls 122 of said housing 120 (FIG. 1A). Then spring ring 200 (FIG. 1C) can be inserted into the anode housing 120 so that it lies against the inside surface of the closed end of said housing as shown in FIG. 1A. Spring ring 200, preferably of stainless steel, has a central aperture 250 therethrough bounded by circumferential ring surface 255. Ring surface 255 is not flat but rather has integral convolutions 257 therein as shown in FIG. 1D. The convolutions 257 gives ring 200a spring action when it is inserted in the anode housing 120 as pressure is applied to the ring. Next one or more spacer disks 300, preferably of stainless steel, can be inserted into anode housing 120 so that it presses onto spring ring 200 as shown in FIG. 1A. The spacer disks 300 can be solid flat disks as shown in FIG. 1B. A plurality of such spacer disks 300 can be employed to assure a tight fit of the cell contents within the completed cell. A lithium anode sheet 150, of lithium or lithium alloy metal, can then be inserted into the anode housing so that it lies against spacer disk 300 as shown in FIG. 1A. The anode housing can be inverted so that its open end is on top. Separator sheet 160, preferably of microporous polypropylene, can then be inserted against the lithium anode sheet 150.

The electrolyte solution can then be poured over the exposed surface of the separator sheet 160 so that it becomes absorbed into the separator. The dry cathode sheet 170 above described comprising the $FeS_2+FeS$ actives, can be cut to proper size and then inserted against the exposed side of the separator sheet 160. In this manner all of the cell components are inserted into the anode housing 120. The cathode housing 130 can then be inserted over the anode housing 120 so that the side wall 136 of the cathode housing 130 covers side wall 122 of anode housing 120 with insulator 140 therebetween. The edge 135 of the cathode housing 130 is crimped over the exposed insulator edge 142. The edge 135 bites into the insulator edge 142 to close the cell and tightly seal the cell contents therein. This results in a durable button cell 100 which resists electrolyte leakage.

In finding an effective and stable electrolyte for the primary $Li/(FeS_2+FeS)$ cell the following factors should be considered: The electrolyte comprises a lithium salt dissolved in a organic solvent or solvent mixture. It has been determined herein that the electrolyte for the primary $Li/(FeS_2+FeS)$ cell desirably have a relatively low viscosity. It has been determined advantageous that the electrolyte have a viscosity of less than about 1.7 centipoise, desirably less than about 1.5 centipoise, preferably between about 0.9 and 1.5 centipoise, for example, between about 1.0 and 1.5. The low level viscosity of the electrolyte makes it more likely that there will be good ionic mobility, that is, good transport of the lithium ions from anode to cathode where they are needed to react with the $FeS_2$ and FeS in the cathode. Additionally, the low level viscosity of the electrolyte reduces the degree of lithium ion concentration polarization from occurring, especially when the cell is subjected to high rate or high power discharge. When the electrolyte has a high viscosity, lithium ions tend to buildup at or near the anode surface during cell discharge, while the supply of lithium ions at the cathode surface becomes starved or much less by comparison. A low viscosity electrolyte for the $Li/(FeS_2+FeS)$ cell can reduce the lithium ion buildup at the anode and can increase the supply of lithium ion approaching the cathode. The supply of lithium ions ($Li^+$) at the cathode increases because of the improved ionic mobility of the lithium ions through the electrolyte medium. As a result the cell performance improves, especially at high rate discharge conditions.

Another consideration is that in finding a good electrolyte is that the electrolyte exhibit good ionic conductively. It has been determined by Applicants herein that the primary $Li/(FeS_2+FeS)$ cell, which includes a lithium salt dissolved in the organic solvent mixture, may desirably have a measured ionic conductivity of between about 5 and 15 milliSiemens/cm. The electrolyte solvent mixture desirably has properties which promote dissociation of the lithium salt to be dissolved therein. The dielectric constant for the solvent mixture, is one indicator of whether a particular solvent or solvent mixture will promote good dissociation (ionization) of the salt thereby allowing more of the lithium salt to dissolve and remain dissolved in the solvent. (Other inherent physiochemical properties of the solvent may also be factors in establishing whether good solubility of the lithium salt is achieved.) A solvent with high dielectric constant implies that the solvent may have the property of keeping certain charged ions apart and thereby implies that good dissociation (solubility) of the lithium salt may be achieved. It is desired that the electrolyte solvent for the primary $Li/(FeS_2+FeS)$ cell have a dielectric constant greater than about 10, desirably between about 10 and 100, for example, between about 20 and 90 (at 25° C.). The final electrolyte (lithium salt dissolved in electrolyte solvent mixture) for the $Li/FeS_2$ cell desirably has a viscosity of less than about 1.7 centipoise, for example, between about 0.9 and 1.5 centipoise (at 25° C.) and the electrolyte ionic conductivity may be between about 5 and 15 milliSiemens/cm or even higher, if possible.

Another consideration in forming an effective and stable electrolyte for the primary $Li/(FeS_2+FeS)$ cell is that the electrolyte be unreactive with the lithium anode and also be unreactive with cathode components which includes iron disulfide and iron sulfide particles, conductive carbon, and binder material. The electrolyte must be stable as well and not degrade significantly with time or when subjected to variations in ambient temperature reflecting normal cell usage conditions.

Yet another consideration in forming an effective electrolyte is that the electrolyte not exacerbate the problem of lithium anode passivation, which is a problem associated with lithium cells in general. When the primary $Li/FeS_2$ cell is left in storage for extended periods a passivation coating or film gradually develops on the lithium anode surface. Certain discharge/rest protocols may also increase the rate of buildup of a deleterious passivation layer on the lithium anode surface. The passivation layer can reach a certain level without interfering significantly with cell performance and to some degree can even be beneficial in that it can protect the lithium anode from deleterious side reaction with the electrolyte. However, rapid and continued buildup of the passivation layer on the surface of the lithium anode is undesirable, since such continued, unabated buildup of the passivation layer can significantly increase the cell's internal resistance. This in turn can lower the cell's power output capability and reduce performance and capacity. Thus, it is desirable that the electrolyte for the Li/(FeS$_2$+FeS) cell induce a stable passivation layer on the anode surface. That is, the electrolyte should not cause or promote a rapid and continued buildup of a deleterious passivation layer on the surface of the anode as the cell is discharged under normal usage or stored for extended periods.

Desirable electrolyte systems for the Li/(FeS$_2$+FeS) cell have been determined to be as described in the above Summary of the Invention and will not be repeated here. Such electrolyte mixtures are effective electrolytes for the Li/(FeS$_2$+FeS) system.

Figure 1A:
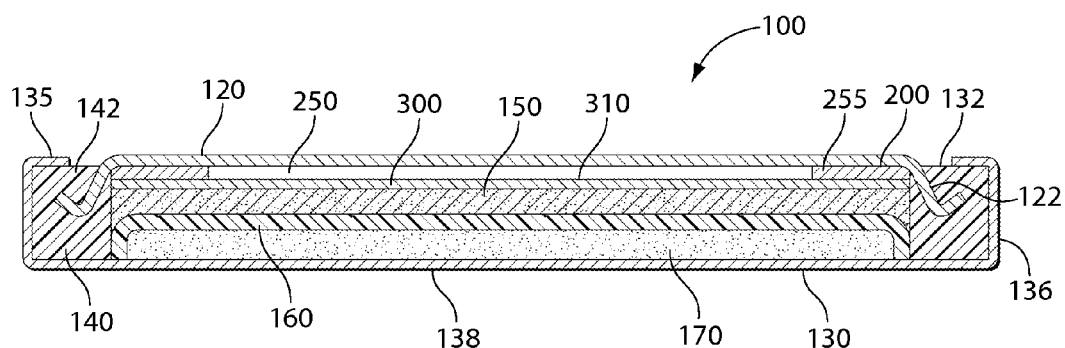
FIG. 1A is a cross sectional view of an improved Li/FeS$_2$ cell of the invention as presented in a button cell embodiment.
Figure 1B:
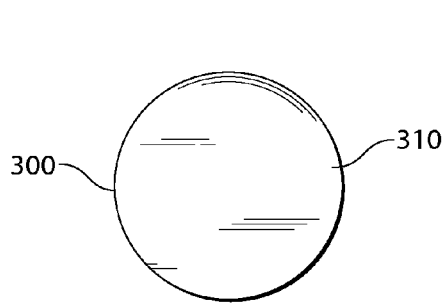
FIG. 1B is a plan view of a spacer disk for insertion into the cell of FIG. 1A.
Figure 1C:
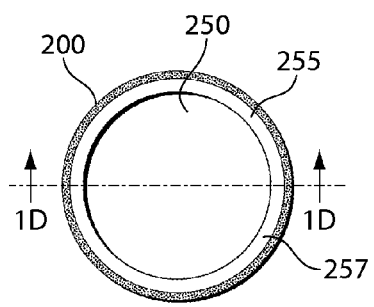
FIG. 1C is plan view of a spring ring for insertion into the cell of FIG. 1A.
Figure 1D:
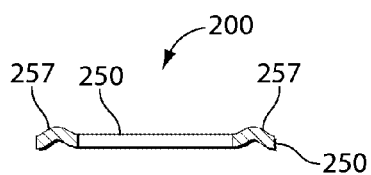
FIG. 1D is a cross sectional view of the spring ring of FIG. 1C.

In another embodiment the Li/(FeS$_2$+FeS) cell may be in the configuration of a cylindrical cell 10 as shown in FIG. 1. The cylindrical cell 10 may have a spirally wound anode sheet 40, cathode 60 with separator sheet 50 therebetween as shown in FIGS. 2-5. The Li/(FeS$_2$+FeS) cell 10 internal configuration, apart from the difference in cathode composition, may be similar to the spirally wound configuration shown and described in U.S. Pat. No. 6,443,999. The anode sheet 40 as shown in the figures comprises lithium metal and the cathode sheet 60 comprises iron disulfide (FeS$_2$) commonly known as "pyrite". The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a ⅔A cell (35×15 mm). However, it is not intended to limit the cell configuration to cylindrical shape. Alternatively, the cell of the invention may have an anode comprising lithium metal or lithium alloy and a cathode comprising iron disulfide (FeS$_2$) and iron sulfide (FeS) and electrolyte systems as herein described, in the form of a spirally wound prismatic cell, for example a rectangular cell having the overall shape of a cuboid.

Figure 3:
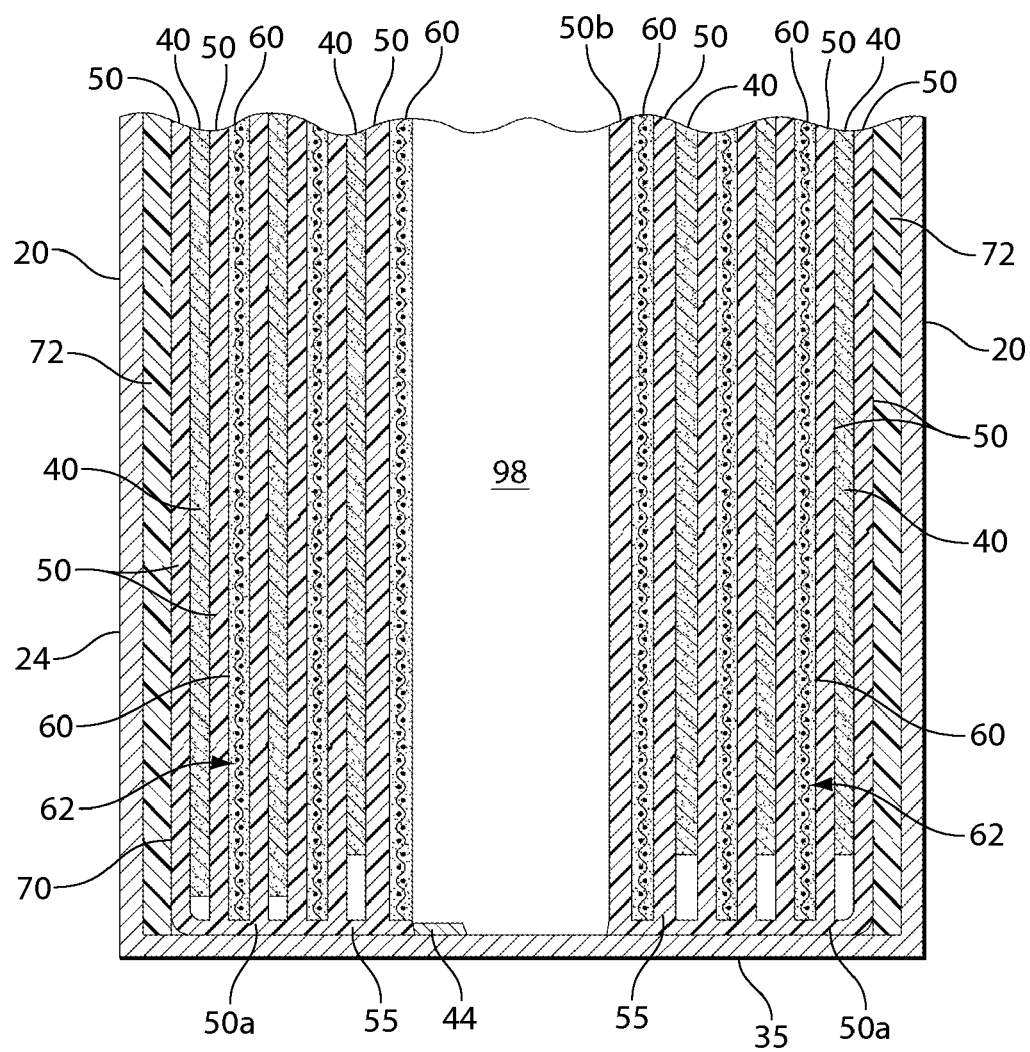
FIG. 3 is a partial cross sectional elevation view of the cell taken through sight lines 2-2 of FIG. 1 to show a spirally wound electrode assembly.
Figure 4:
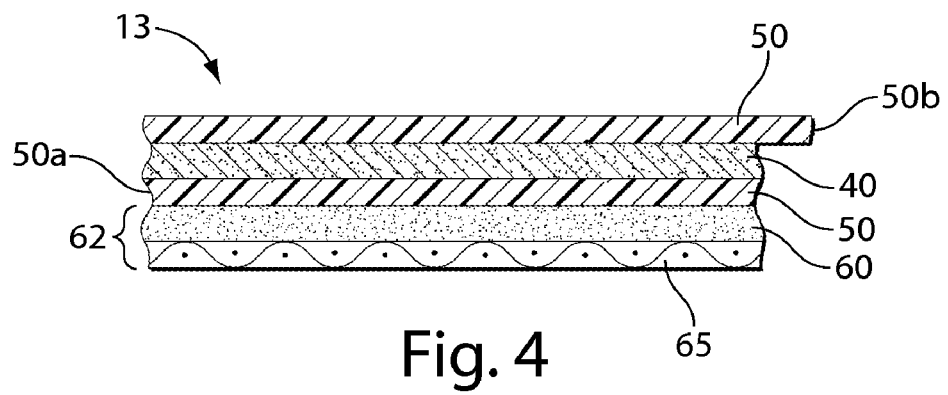
FIG. 4 is a schematic showing the placement of the layers comprising the electrode assembly.
Figure 5:
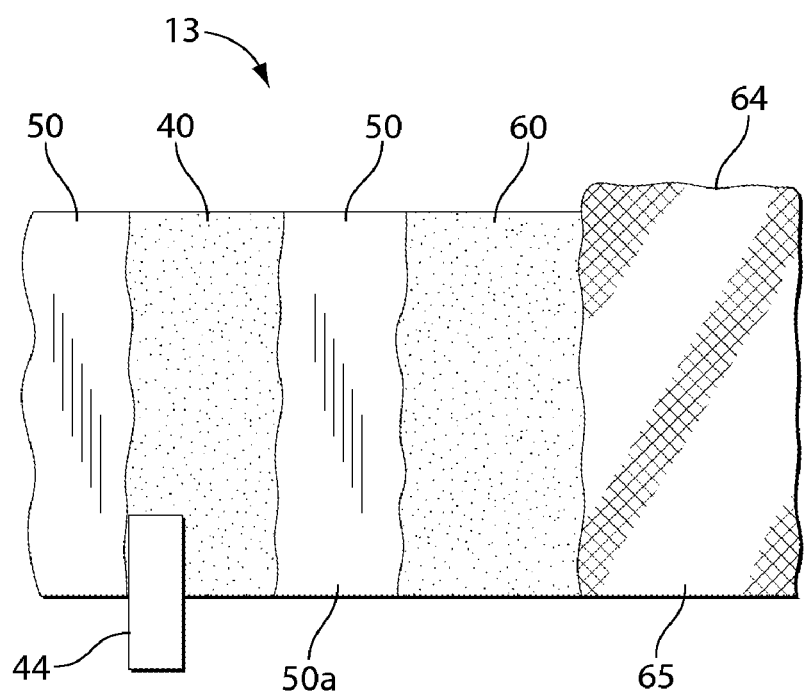
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide (FeS$_2$) coated onto metallic substrate 65 (FIG. 4).

The electrode composite 13 (FIGS. 4 and 5) can be made in the following manner: The cathode 60 comprising iron disulfide (FeS$_2$) and iron sulfide (FeS) powder dispersed therein can be initially prepared in the form of a wet slurry which is coated onto a conductive substrate sheet or metal foil 65. The conductive substrate 65 may be a sheet of aluminum or stainless steel, for example, expanded metal foil of aluminum or stainless steel (FIG. 4). If an aluminum sheet 65 is used it may be a sheet of aluminum without openings therethrough or may be a sheet of expanded aluminum foil (EXMET expanded aluminum foil) with openings therethrough thus forming a grid or screen. (EXMET aluminum or stainless steel foil from Dexmet Company, Branford, Conn.). The expanded metal foil may have a basis weight of about 0.024 g/cm$^2$ forming a mesh or screen with openings therein.

The wet cathode slurry mixture comprising iron disulfide (FeS$_2$) plus iron sulfide (FeS), binder, conductive carbon and solvents, for example, as shown in Table 1, is prepared by mixing the components, until a homogeneous mixture is obtained.

The above quantities (Table 1) of components of course can be scaled proportionally so that small or large batches of cathode slurry can be prepared. The wet cathode slurry thus may have the following representative composition: FeS$_2$ powder (46.9 wt. %); FeS powder (13.9 wt %); Binder, Kraton G1651 (1.4 wt. %); Graphite, Timrex KS6 (3.0 wt %), Actylene Black, Super P (1.2 wt %), Hydrocarbon Solvents, ShellSol A100 (13.4 wt %) and ShelSol OMS (20.2 wt %)

After the wet cathode slurry is formed (Table 1), the wet slurry is then coated onto a side of the conductive substrate 65. The conductive substrate 65 with wet cathode slurry coated thereon is then dried in conventional convective oven (or in inert gas) to evaporate the solvents in the slurry, thereby forming a dry cathode coating 60 on one side of conductive substrate 65 (FIGS. 4 and 5). The process is preferably repeated to also coat the opposite side of conductive substrate 65 with the wet cathode slurry (Table 1). The wet cathode slurry on the opposite side of conductive substrate 65 can then be subjected to drying in a convective oven to evaporate solvents, thereby forming a dry cathode coating 60 also on the opposite side of conductive substrate 65. The drying of the wet cathode slurry coated on the metal substrate 65 is accomplished preferably by gradually adjusting or ramping up the oven temperature (to avoid cracking the coating) from an initial temperature of 40° C. to a final temperature not to exceed 130° C. for about 7-8 minutes or until the hydrocarbon solvent has substantially all evaporated. (At least about 95 percent by weight of the solvents are evaporated, preferably at least about 99.9 percent by weight of the solvents are evaporated.) The dry cathode coating 60 (whether applied to only one side or both sides of conductive substrate 65) is then subjected to calendering to compress the thickness of said dry cathode coating 60, thus forming the completed cathode composite 62 (FIGS. 4 and 5).

The anode 40 can be prepared from a solid sheet of lithium metal. The anode 40 is desirably formed of a continuous sheet of lithium metal (99.8% pure). The lithium metal in anode 40 may be alloyed with small amounts of other metal, for example aluminum, or calcium which typically comprises less than about 1 or 2 wt. %, and even up to about 5 wt. % of the lithium alloy. The lithium sheet forming anode 40 does not require a substrate. The lithium anode 40 can be advantageously formed from an extruded sheet of lithium metal having a thickness of between about 0.09 and 0.20 mm desirably between about 0.09 and 0.19 mm for the spirally wound cell.

Individual sheets of electrolyte permeable separator material 50, preferably of microporous polypropylene or polyethylene having a thickness of about 0.025 mm or less, desirably between about 0.008 and 0.025 mm, is inserted on each side of the lithium anode sheet 40 (FIGS. 4 and 5). In a preferred embodiment the separator sheet may be microporous polyethylene or polypropylene of thickness about 1 mil (0.025 mm.) The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
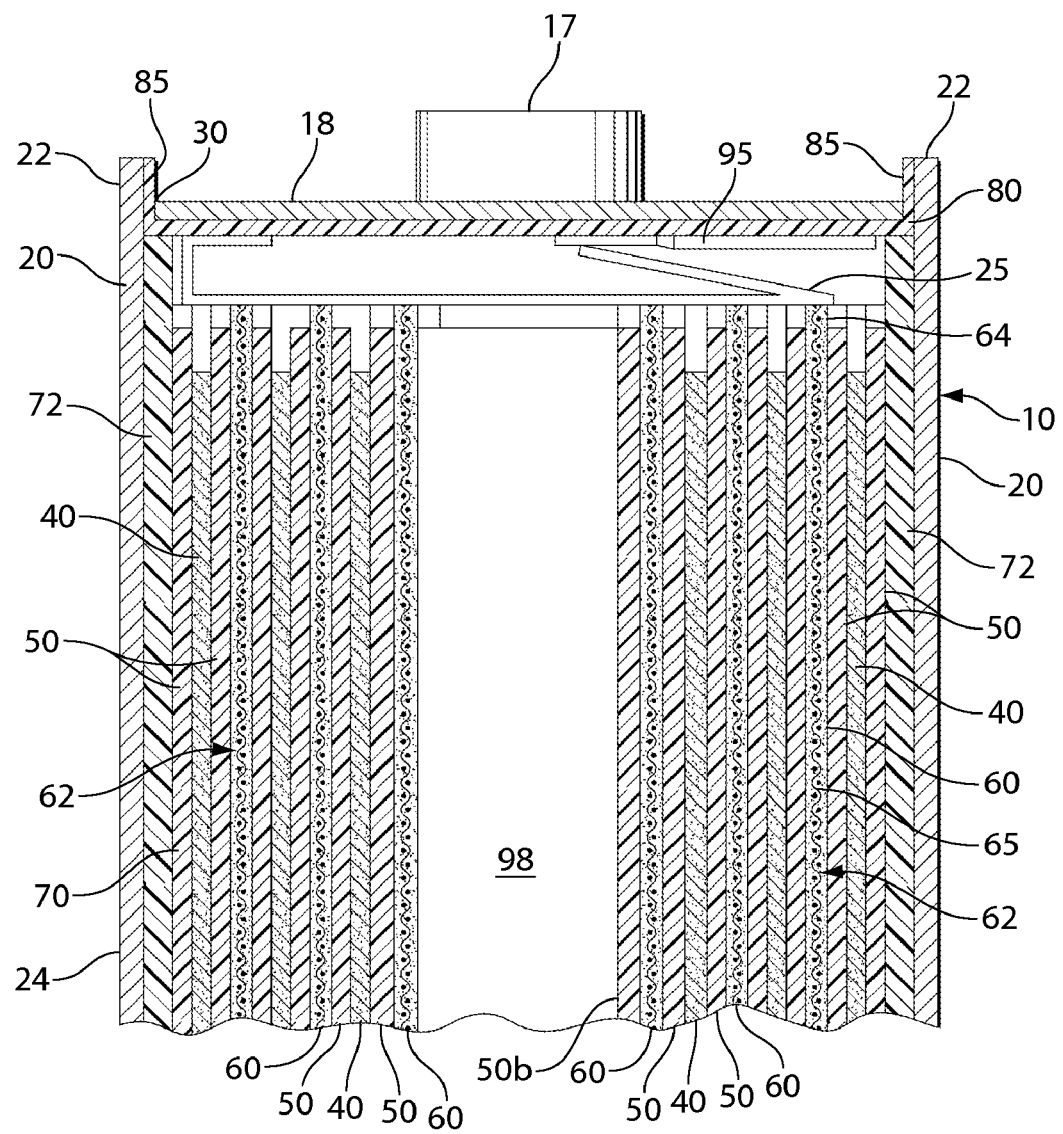
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20 (FIG. 2). As wound, the outer layer of the electrode spiral 70 comprises separator material 50 shown in FIGS. 2 and 3. An additional insulating layer 72, for example, a plastic film such as polyester tape, can desirably be placed over the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

A desirable electrolyte mixture as described in the above Summary of the Invention section can then be added to the wound electrode spiral 70 after it is inserted into the cell casing 20.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 forms an extended portion 64 extending from the top of the wound spiral as shown in FIG. 2. The extended portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of close end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp, for a prolonged period, the resistance of the PTC device increases dramatically, thus shutting down the abnormally high drain. It will be appreciated that devices other than vent 19 and PTC device 95 may be employed to protect the cell from abusive use or discharge.

EXAMPLE

Experimental Test Lithium Coin Cells with Cathode Comprising $FeS_2$ and FeS

Experimental test Li/($FeS_2$+FeS) or Li/FeS and control Li/$FeS_2$ coin cells 100 (FIG. 1A) were prepared as follows:
Experimental Test Coin Cell Assembly:

A coin shaped cathode housing 130 of aluminum plated steel and a coin shaped anode housing 120 of nickel plated steel is formed of a similar configuration shown in FIG. 1A. The finished cell 100 had an overall diameter of about 20 mm and a thickness of about 3 mm. (This is the size of a conventional ASTM size 2032 coin cell.) The loading of the cathode active material within cathode housing 130 for each of the cells was essentially the same at about 0.02 gram per cm² of anode-cathode interfacial area with separator therebetween. The lithium in the anode housing 120 was in electrochemical excess.

Each button cell 100 was made generally as above described with respect to fabrication of cell 100. In forming each button cell 100a plastic insulating of ring shape 140 was first fitted around the side wall 122 of anode housing 120 (FIG. 1A). A spring ring 200 of stainless steel was placed against the inside surface of the anode housing 120. Ring 200 is inserted into anode housing 120 without the need to weld the ring to the anode housing 120. Ring 200, shown best in FIG. 1C, has a circumferential edge 255 bounding central aperture 250. Circumferential edge surface 255 has convolutions 257 (FIG. 1D) integrally formed therein so that edge surface 255 does not lie entirely in the same plane. When spring ring 200 is inserted into anode housing 120 and pressure is applied to the edge surface 255, convolutions 257 therein give the ring resilience and a spring effect. A spacer disk 300 having a flat solid surface 310 is then next inserted into the anode housing 120 so that it lies against spring ring 200 (FIG. 1A). More than one spacer disk 300 may be inserted on top of each other in stacked arrangement in order to provide a tight fit of the cell contents within the cell. In the test coin cell 100 three stainless steel spacer disks 300 were applied in stacked arrangement against spring ring 200.

Control Cells and Test Cells were prepared in the manner above described with same lithium anode and the following specific cathode compositions and electrolyte:

A lithium disk 150 formed of a sheet of lithium metal having a thickness of 0.006 inch (0.15 mm) was punched out in a dry room using a 0.56 inch hand punch. The lithium disk 150 (FIG. 1A) forming the cell's anode was then pressed onto the underside of the spacer disks 300 using a hand press. The electrolyte used in all of the cells was a mixture of lithium bistrifluoromethylsulfonyl imide, $Li(CF_3SO_2)_2N$ (LiTFSI) yielding a concentration of 0.8 moles per liter in a solvent mixture of 1,3-dioxloane (80 vol %) and sulfolane (20 vol %) with 0.1 wt. % pyridine added. The separator sheet 160 was of Celgard 2500 microporous polypropylene material of same diameter in each of the cells. The cells had the same anode-cathode interfacial area with same separator therebetween.

A cathode slurry 170 was then prepared and coated over one side of an aluminum sheet 165 of thickness 1.5 mil (0.0381 mm). The cathode slurry was prepared using a mixture of Hydrocarbon Solvents, ShellSol A100 solvent and ShelSol OMS solvent as above indicated.

The wet cathode slurry on the aluminum sheet was then dried in an oven between 40° C. and 130° C. until the solvent in the cathode slurry all evaporated, thus forming a dry cathode coating comprising $FeS_2$ and/or FeS actives, conductive carbon and elastomeric binder coated on a side of the aluminum sheet. The dried cathode coating on the aluminum sheet was calendered to form a dry cathode 170.

The anode housing 120 is inverted so that its open end faces up. Separator disk 160 is inserted into the anode housing 120 so that it contacts the lithium anode disk 150. Separator disk 160 was of microporous polypropylene (Celgard CG2500 separator from Celgard, Inc.) The separator disk was previously punched out from sheets into the required disk shape using a hand punch having a diameter of 0.69 inch (17.5 mm).

A preferred electrolyte of the invention designated electrolyte no. 1 was prepared and this same electrolyte was used in each of the control cells and each of the test cells. The preferred electrolyte contained 0.8 molar (0.8 mol/liter) concentration of $Li(CF_3SO_2)_2N$ (LiTFSI) salt dissolved in an organic solvent mixture comprising about 80 vol. % 1,3-dioxolane (DX) and 20 vol. % sulfolane (SL). Then about 0.1 percent by weight pyridine was added to form the final electrolyte solution. With the anode housing 120 inverted with the open end on top, 0.2 gram of the electrolyte solution was added over separator 160.

The cathode after drying had the following composition for each of the control and test cells:

Control Cell: (Cathode with $FeS_2$ Cathode Active Material)

$FeS_2$ powder (91.5 wt. %); Binder, styrene-ethylene/butylene-styrene elastomer (Kraton G1651) (2.1 wt. %); Graphite (Timrex KS6) (4.6 wt %), and Carbon Black (Super P carbon black) (1.8 wt %). The cathode loading of $FeS_2$ was 0.0218 gram per cm² of interfacial area. The interfacial area is the anode-cathode interfacial area with separator therebetween.

Test Cell 1: (Cathode with FeS Cathode Active Material)

FeS powder (91.5 wt. %); Binder, styrene-ethylene/butylene-styrene elastomer (Kraton G1651) (2.1 wt. %); Graphite (Timrex KS6) (4.6 wt %), Carbon Black (Super P carbon black) (1.8 wt %). The cathode loading of FeS was 0.0178 gram per cm² of interfacial area. The interfacial area is the anode-cathode interfacial area with separator therebetween.

Test Cell 2: (Cathode with $FeS_2$ and FeS Cathode Active Material in Admixture)

$FeS_2$ powder (70.6 wt. %); FeS powder (20.9 wt. %); Binder, styrene-ethylene/butylene-styrene elastomer (Kraton G1651) (2.1 wt. %); Graphite (Timrex KS6) (4.6 wt %), and Carbon Black (Super P carbon black) (1.8 wt %). The loading of $FeS_2$ in the cathode was 0.0160 gram per cm of interfacial area and the loading of FeS in the cathode was 0.0047 gram per cm² of interfacial area. The interfacial area is the anode-cathode interfacial area with separator therebetween.

The dried cathode 170 was cut to size in disk shape with a hand punch having a diameter of 0.44 inch (11.1 mm) and inserted into the anode housing 120 so that it contacts the electrolyte soaked separator 160. The dried cathode coating on the aluminum sheet faces separator 160 which in turn faces the anode active area.

The cathode housing 130 was then placed over the filled anode housing 120 so that the side wall 136 of the cathode housing 130 covered side wall 122 of anode housing 120 with insulator 140 therebetween. The closed end 138 of the cathode housing 130 was centered within a mechanical crimper. A mechanical crimper arm was then pulled down all of the way to crimp the peripheral edge 135 of the cathode housing 130 over the edge 142 of insulating disk 140. This process was repeated for each of three identical control cells and each of the three identical test cells 1 and three identical test cells 2 with same electrolyte, thus forming the completed coin cell 100 shown in FIG. 1A. After each cell had been formed, the outside surfaces of the housings of the cells were wiped cleaned with methanol.

Electrochemical Performance of Experimental Test Cells and the Control Cell:

After the control and test cells had been formed as above described, the discharge capacity of each cell was tested using a digital camera test that was meant to mimic the use of the cell (to take and view pictures) in a digital camera.

Before the cells were subjected to the Digicam test they were stored at room temperature for 24 hours and then were predischarged at a constant current drain of 1 milliAmp for 40 minutes. This corresponded to a depth of discharge of about 3 percent of the cell's capacity.

The control cells and test cells were the subjected to digital camera test (Digicam test) consists of the following pulse test protocol wherein each of the cells was drained by applying pulsed discharge cycles to the cell: Each cycle consists of both a 6.5 milliWatt pulse for 2 seconds followed immediately by a 2.82 milliWatt pulse for 28 seconds. After every 10 pulsed cycles the cells were allowed to rest for 55 minutes. The cycles are continued until a cutoff voltage of 1.05V is reached. The number of cycles required to reach the cutoff voltage were recorded.

TABLE II

Discharge Performance of $Li/FeS_2$ and Li/FeS Coin Cells With Different Cathode Active Mixtures and Same Electrolyte[2]

| Cathode[1] | Cell No. | Digicam Test Number of Pulsed Cycles[3] 1.05 V |
|---|---|---|
| Control 1 (with $FeS_2$) | 1 | 618 |
| Control 1 (with $FeS_2$) | 2 | 641 |
| Control 1 (with $FeS_2$) | 3 | 668 |
| Average | | 642 |
| Test 1 (with FeS) | 4 | 278 |
| Test 1 (with FeS) | 5 | 316 |
| Test 1 (with FeS) | 6 | 327 |
| Average | | 307 |
| Test 2 (with $FeS_2$ + FeS) | 4 | 579 |
| Test 2 (with $FeS_2$ + FeS) | 5 | 609 |
| Test 2 (with $FeS_2$ + FeS) | 6 | 637 |
| Average | | 608 |

Notes:
[1]The cathode in the Control Cells contained $FeS_2$ cathode active material. The cathode in the Test 1 cells contained FeS cathode active material. The cathode in the Test 2 cells contained $FeS_2$ and FeS cathode active material.
[2]The electrolyte for each cell contained 0.8 molar (0.8 mol/liter) of $Li(CF_3SO_2)_2N$ (LiTFSI) salt dissolved in an organic solvent mixture comprising 80 vol. % 1,3-dioxolane (DX) and 20 vol. % sulfolane (SL) with 0.1 wt. % of pyridine added to the electrolyte)
[3]The pulsed cycle (Digicam Test) consists of both a 6.5 milliWatt pulse for 2 seconds followed immediately by a 2.82 milliWatt pulse for 28 seconds to mimic use in a digital camera. After every 10 pulsed cycles the cells were allowed to rest for 55 minutes. These cycles were repeated until cutoff voltage of 1.05 V was reached. (Prior to the Digicam Test the fresh cells were stored at room temperature for 24 hours and then all predischarged to reduce the cell's capacity by 3 percent.)

The above reported test results show that a mixture of $FeS_2$ and FeS as cathode active material can result in a cell with nearly as good performance as use of only $FeS_2$ cathode active material. It is believed that this is achieved in part due to the higher discharge efficiency of the FeS$_2$ in combination with FeS particles, at high rate discharge. Also since FeS is not as hard a material as FeS$_2$, the cells wherein FeS is added to the FeS$_2$ in admixture therewith, has additional benefit. One important benefit is that the average particle size and particle size distribution of the cathode active materials are more readily controlled when FeS material is added to the cathode. (Softer particles can be more readily reduced to desired particle size than harder particles and at less expense.)

Another benefit of adding FeS powder to the cathode in admixture with FeS$_2$ powder is that the overall preparation and cathode is made easier because of the softer FeS particles. It is also speculated that the softer FeS particles may be resulting in improved conductivity of the cathode.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a housing; a positive and a negative terminal; an anode comprising at least one of a lithium metal and lithium alloy; a cathode comprising iron disulfide (FeS$_2$), iron sulfide (FeS), and conductive carbon, said cell further comprising an electrolyte inserted therein, said electrolyte comprising a lithium salt comprising bistrifluoromethylsulfonyl imide (Li(CF$_3$SO$_2$)$_2$N) dissolved in a solvent mixture comprising dioxolane and sulfolane, wherein the FeS and FeS$_2$, has a bimodal particle size distribution and wherein the FeS$_2$ has an average particle size between about 20 and 35 micron and the FeS has an average particle size between about 5 and 15 micron.

2. The cell of claim 1 wherein the FeS content in said cathode comprises between about 5 and 30 percent by weight of the total FeS$_2$ plus FeS in said cathode.

3. The cell of claim 1 wherein said electrolyte further comprises lithium iodide (LiI) salt.

4. The cell of claim 1 wherein the dioxolane comprises 1,3-dioxolane.

5. The cell of claim 1 wherein said solvent mixture comprises between about 75 and 85 percent by volume dioxolane and between about 15 and 25 percent by volume sulfolane.

6. The cell of claim 1 wherein said solvent mixture further comprises pyridine.

7. The cell of claim 1 wherein said anode and cathode are spirally wound with a separator sheet therebetween.

8. A primary electrochemical cell comprising a housing; a positive and a negative terminal; an anode comprising at least one of a lithium metal and lithium alloy; a cathode comprising iron disulfide (FeS$_2$), iron sulfide (FeS), and conductive carbon, said cell further comprising an electrolyte inserted therein, said electrolyte comprising a lithium salt comprising bistrifluoromethylsulfonyl imide (Li(CF$_3$SO$_2$)$_2$N) dissolved in a solvent mixture comprising dioxolane and sulfolane, wherein said electrolyte further comprises an additive comprising an alkylpyrazole, wherein the FeS and FeS$_2$ has a bimodal particle size distribution and wherein the FeS$_2$ has an average particle size between about 20 and 35 micron and the FeS has an average particle size between about 5 and 15 micron.

9. The cell of claim 8 wherein said solvent mixture comprises between about 70 and 90 volume percent 1,3-dioxolane and between about 10 and 30 volume percent sulfolane.

10. The cell of claim 8 wherein said alkylpyrazole additive is selected from the group consisting of 1,3-dimethylpyrazole and 1,3,5-trimethylpyrazole, and mixtures thereof.

11. The cell of claim 8 wherein said alkylpyrazole additive comprises 1,3-dimethylpyrazole.

12. The cell of claim 8 wherein said alkylpyrazole additive comprises 1,3,5-trimethylpyrazole.

13. The cell of claim 10 wherein said alkylpyrazole comprises between about 0.05 and 1.0 percent by weight of said electrolyte.

14. The cell of claim 10 wherein said alkylpyrazole comprises between about 0.1 and 1.0 percent by weight of said electrolyte.

15. The cell of claim 8 wherein the cathode comprises a coating comprising iron disulfide (FeS$_2$) particles and iron sulfide (FeS) particles coated on both sides of a substrate.

16. The cell of claim 8 wherein the anode and cathode are in wound configuration with a separator therebetween.

17. A primary electrochemical cell comprising a housing; a positive and a negative terminal; an anode comprising at least one of a lithium metal and lithium alloy; a cathode comprising iron disulfide (FeS$_2$), iron sulfide (FeS), and conductive carbon, said cell further comprising an electrolyte inserted therein, said electrolyte comprising a lithium salt comprising bistrifluoromethylsulfonyl imide (Li(CF$_3$SO$_2$)$_2$N) dissolved in a solvent mixture comprising dioxolane and sulfolane, wherein said electrolyte further comprises an additive comprising an alkylimidazole, wherein the FeS and FeS$_2$ has a bimodal particle size distribution and wherein the FeS$_2$ has an average particle size between about 20 and 35 micron and the FeS has an average particle size between about 5 and 15 micron.

18. The cell of claim 17 wherein said solvent mixture comprises between about 70 and 90 volume percent 1,3-dioxolane and between about 10 and 30 volume percent sulfolane.

19. The cell of claim 17 wherein said alkylimidazole additive comprises 1,2-dimethylimidazole.

20. The cell of claim 19 wherein said alkylimidazole comprises between about 0.05 and 1.0 percent by weight of said electrolyte.

21. The cell of claim 19 wherein said alkylimidazole comprises between about 0.1 and 1.0 percent by weight of said electrolyte.

22. The cell of claim 17 wherein the cathode comprises a coating comprising iron disulfide (FeS$_2$) particles and iron sulfide (FeS) particles coated on both sides of a substrate.

23. The cell of claim 17 wherein the anode and cathode are in wound configuration with a separator therebetween.

24. A primary electrochemical cell comprising a housing; a positive and a negative terminal; an anode comprising at least one of a lithium metal and lithium alloy; a cathode comprising iron disulfide (FeS$_2$), iron sulfide (FeS), and conductive carbon, said cell further comprising an electrolyte inserted therein, said electrolyte comprising a lithium salt comprising lithium iodide (LiI) dissolved in a solvent mixture comprising dioxolane, dimethoxyethane, and sulfolane. wherein the FeS and FeS$_2$ has a bimodal particle size distribution and wherein the FeS$_2$ has an average particle size between about 20 and 35 micron and the FeS has an average particle size between about 5 and 15 micron.

25. The cell of claim 24 wherein the FeS content in said cathode comprises between about 5 and 30 percent by weight of the total FeS$_2$ plus FeS in said cathode.

26. The cell of claim 24 wherein said dioxolane comprises 1,3-dioxolane.

27. The cell of claim 24 wherein said dimethoxyethane comprises 1,2-dimethoxyethane.

28. The cell of claim 24 wherein the weight ratio of dioxolane to dimethoxyethane is between about 0.82 and 9.0.

29. The cell of claim 24 wherein the weight ratio of dioxolane to dimethoxyethane is between about 0.82 and 2.3.

30. The cell of claim 24 wherein said sulfolane is greater than about 4.8 percent by weight of the solvent mixture.

31. The cell of claim 24 wherein said sulfolane is between about 4.8 and 6.0 percent by weight of the solvent mixture.

32. The cell of claim 24 wherein said solvent mixture further comprises between about 0.1 and 1.0 percent by weight 3,5-dimethylisoxazole.

33. The cell of claim 24 wherein the water content in said electrolyte is between about 100 and 1000 parts by weight water per million parts by weight electrolyte.

34. The cell of claim 24 wherein the water content in said electrolyte is between about 600 and 1000 parts by weight water per million parts by weight electrolyte.

35. The cell of claim 24 wherein the water content in said electrolyte is between about 100 and 300 parts by weight water per million parts by weight electrolyte.

36. The cell of claim 24 wherein said cathode comprising iron disulfide ($FeS_2$), iron sulfide (FeS), and conductive carbon is coated onto a substrate sheet comprising aluminum.

37. The cell of claim 24 wherein said anode and cathode are spirally wound with a separator sheet therebetween.

38. A primary electrochemical cell comprising a housing; a positive and a negative terminal; an anode comprising lithium; a cathode comprising iron disulfide ($FeS_2$), iron sulfide (FeS), and conductive carbon, said cell further comprising an electrolyte comprising a lithium salt comprising bis-trifluoromethylsulfonyl imide ($Li(CF_3SO_2)_2N$) dissolved in a solvent comprising dimethoxyethane, sulfolane, and tin iodide ($SnI_2$) additive, wherein the FeS and $FeS_2$ has a bimodal particle size distribution and wherein the $FeS_2$ has an average particle size between about 20 and 35 micron and the FeS has an average particle size between about 5 and 15 micron.

39. The cell of claim 38 wherein the FeS content in said cathode comprises between about 5 and 30 percent by weight of the total $FeS_2$ plus FeS in said cathode.

40. The cell of claim 38 wherein the electrolyte has a viscosity between about 0.9 and 1.5 centipoise.

41. The cell of claim 38 wherein the electrolyte comprises between about 1000 and 5000 parts by weight tin iodide ($SnI_2$) therein per million parts electrolyte by weight.

42. The cell of claim 38 wherein the solvent is essentially free of dioxolane.

43. The cell of claim 38 wherein said solvent comprises less than 200 parts by weight of dioxolane per million parts by weight solvent.

44. The cell of claim 38 wherein said cathode comprising iron disulfide ($FeS_2$) and conductive carbon is coated onto a substrate sheet comprising aluminum.

45. The cell of claim 38 wherein the anode comprises a sheet of lithium or lithium alloy.

46. The cell of claim 38 wherein said cathode comprising iron disulfide ($FeS_2$) and iron sulfide (FeS) is in the form of a coating bound to a metallic substrate and wherein said anode comprising lithium and said cathode are arranged in spirally wound form with a separator material therebetween.

47. A primary electrochemical cell comprising a housing; a positive and a negative terminal; an anode comprising lithium; a cathode comprising iron disulfide ($FeS_2$) iron sulfide (FeS), and conductive carbon, said cell further comprising an electrolyte comprising a lithium salt comprising lithium iodide (LiI) dissolved in a solvent comprising dimethoxyethane, sulfolane, and tin iodide ($SnI_2$) additive, wherein the FeS and $FeS_2$ has a bimodal particle size distribution and wherein the $FeS_2$ has an average particle size between about 20 and 35 micron and the FeS has an average particle size between about 5 and 15 micron.

48. The cell of claim 47 wherein the FeS content in said cathode comprises between about 5 and 30 percent by weight of the total $FeS_2$ plus FeS in said cathode.

49. The cell of claim 47 wherein the electrolyte has a viscosity between about 0.9 and 1.5 centipoise.

50. The cell of claim 47 wherein the electrolyte comprises between about 1000 and 5000 parts by weight tin iodide ($SnI_2$) therein per million parts electrolyte by weight.

51. The cell of claim 47 wherein the solvent is essentially free of dioxolane.

52. The cell of claim 47 wherein said solvent comprises less than 200 parts by weight of dioxolane per million parts by weight solvent.

53. The cell of claim 47 wherein said cathode comprising iron disulfide ($FeS_2$), iron sulfide (FeS), and conductive carbon is coated onto a substrate sheet comprising aluminum.

54. The cell of claim 47 wherein the anode comprises a sheet of lithium or lithium alloy.

55. The cell of claim 47 wherein said cathode comprising iron disulfide ($FeS_2$) and iron sulfide (FeS) is in the form of a coating bound to a metallic substrate and wherein said anode comprising lithium and said cathode are arranged in spirally wound form with a separator material therebetween.

* * * * *